United States Patent
Hattori et al.

(10) Patent No.: US 9,293,969 B2
(45) Date of Patent: Mar. 22, 2016

(54) INVERTER MODULE AND INVERTER INTEGRATED ELECTRIC COMPRESSOR

(75) Inventors: Makoto Hattori, Tokyo (JP); Masahiko Asai, Tokyo (JP); Kazuki Niwa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 551 days.

(21) Appl. No.: 13/699,967

(22) PCT Filed: Oct. 6, 2011

(86) PCT No.: PCT/JP2011/073147
§ 371 (c)(1),
(2), (4) Date: Nov. 26, 2012

(87) PCT Pub. No.: WO2012/050050
PCT Pub. Date: Apr. 19, 2012

(65) Prior Publication Data
US 2013/0069494 A1    Mar. 21, 2013

(30) Foreign Application Priority Data
Oct. 15, 2010    (JP) .................................. 2010-232677

(51) Int. Cl.
*H02K 11/00*    (2006.01)
*F04B 35/04*    (2006.01)
*F04B 39/06*    (2006.01)
(Continued)

(52) U.S. Cl.
CPC ............ *H02K 11/0073* (2013.01); *F04B 35/04* (2013.01); *F04B 39/06* (2013.01); *F04C 23/008* (2013.01); *F04C 2240/808* (2013.01); *F04C 2270/12* (2013.01); *H02M 7/003* (2013.01)

(58) Field of Classification Search
CPC  H02K 11/0073; H02K 11/044; H02K 11/048
See application file for complete search history.

(56) References Cited

U.S. PATENT DOCUMENTS

2009/0244877 A1    10/2009  Yeh et al.
2009/0246047 A1*   10/2009  Hattori et al. ............. 417/410.1

FOREIGN PATENT DOCUMENTS

| CN | 101187364 A | 5/2008 |
| CN | 101682291 A | 3/2010 |
| JP | 9-148776 A  | 6/1997 |

(Continued)

OTHER PUBLICATIONS

Office Action dated Nov. 3, 2014, issued in corresponding Chinese Patent Application No. 201180026316.2, with English Translation (11 pages).

(Continued)

*Primary Examiner* — Dang Le
(74) *Attorney, Agent, or Firm* — Westerman, Hattori, Daniels & Adrian, LLP (57) ABSTRACT

The present invention has an object to provide an inverter module and an inverter integrated electric compressor capable of reliably suppressing noise interference on a control circuit board and facilitating filling with a resin gel material. Provided is an inverter module including a power system circuit board and a control circuit board (30) that are integrated through a resin case, in which an insulating through hole (47) is provided in a region between: a frame ground (42) connected to a high voltage system formed on the control circuit board (30); and a low voltage circuit (46) adjacent to the frame ground (42).

6 Claims, 4 Drawing Sheets (51) Int. Cl.
*F04C 23/00* (2006.01)
*H02M 7/00* (2006.01)

(56) References Cited

FOREIGN PATENT DOCUMENTS

| | | |
|---|---|---|
| JP | 2007-315269 A | 12/2007 |
| JP | 2008-099480 A | 4/2008 |
| JP | 2009-247066 A | 10/2009 |
| JP | 2010-112261 A | 5/2010 |
| JP | 2010-209685 A | 9/2010 |
| WO | 2010/101068 A1 | 9/2010 |
| WO | 2011/078123 A1 | 6/2011 |

OTHER PUBLICATIONS

International Search Report for PCT/JP2011/073147, mailing date of Nov. 1, 2011.

Office Action dated Jul. 13, 2015 issued in counterpart Chinese Application No. 201180026316.2, with English translation (11 pages).

Decision to Grant a Patent dated Mar. 17, 2015, issued in corresponding Japanese Patent Application No. 2010-232677 with English translation (7 pages).

Office Action dated Jan. 8, 2016, issued in counterpart Chinese Patent Application No. 201180026316.2, with English Translation (11 pages).

* cited by examiner

INVERTER MODULE AND INVERTER INTEGRATED ELECTRIC COMPRESSOR

TECHNICAL FIELD

The present invention relates to an inverter module and an inverter integrated electric compressor including an inverter apparatus that is integrally incorporated in a housing of the electric compressor, the inverter module and the inverter integrated electric compressor being suitably applied to a vehicular air-conditioning apparatus.

BACKGROUND ART

An inverter integrated electric compressor including an inverter apparatus integrally incorporated therein is known as a compressor for an air-conditioning apparatus mounted in a hybrid car, an electric car, and the like. In the inverter integrated electric compressor, an inverter accommodating part (inverter box) is provided in the outer periphery of a housing in which an electric motor and a compression mechanism are built, and the inverter apparatus is incorporated in the inverter accommodating part. The inverter apparatus converts DC power supplied from a power supply into AC power, and applies the AC power to the electric motor through a glass sealed terminal.

The inverter apparatus generally includes: a power system circuit board on which a switching circuit including a plurality of semiconductor switching elements, such as insulated gate bipolar transistors (IGBTs), is mounted, the semiconductor switching elements converting DC power into AC power; and a control circuit board on which a control communication circuit including elements that operate at a low voltage, such as a CPU, is mounted. The two circuit boards are placed one above the other at two stages, and are accommodated and set in an inverter case or an outer frame part, to be thereby integrally incorporated in an outer peripheral part of a compressor housing.

In the inverter integrated electric compressor described above, a high voltage system and a low voltage system are mixedly provided in the inverter apparatus, and hence it is necessary to block electromagnetic noise to thereby improve the stability of the control circuit. At the same time, the inverter integrated electric compressor described above is used under severe temperature conditions and vibration conditions, and hence the inverter apparatus is also required to have high vibration-proof properties, moisture-proof properties, and electrical insulating properties. Consequently, it is proposed that an inverter accommodating part in which an inverter apparatus is incorporated is filled with a resin gel material and that a control circuit board is set in a floating state in the resin gel material, and it is also proposed that a shield plate is provided between a low voltage control circuit board and a high voltage circuit for motor driving, the space between which is filled with a resin gel material (see, for example, PTL 1 and PTL 2).

CITATION LIST

Patent Literature

{PTL 1}
Japanese Unexamined Patent Application, Publication No. 2007-315269
{PTL 2}
Japanese Unexamined Patent Application, Publication No. 2010-112261

SUMMARY OF INVENTION

Technical Problem

According to PTL 1, the moisture-proof properties, the electrical insulating properties, and the vibration-proof properties can be enhanced for a power system circuit board and a control circuit board. In addition, because the control circuit board is provided with a through hole, the filling properties of a resin gel material can be enhanced. Unfortunately, such a configuration alone cannot block noise interference on the control circuit board, that is, cannot block electromagnetic noise from propagating from a frame ground connected to a high voltage system toward a low voltage circuit, resulting in insufficient protection against the noise.

Further, according to PTL 2, a shield plate is provided between a low voltage control circuit board and a high voltage circuit for motor driving, and the shield plate is provided with a hole for both air release and gel material filling. Consequently, filling with a resin gel material is facilitated, and noise interference is prevented from occurring between the low voltage control circuit board and the high voltage circuit for motor driving. Unfortunately, such a configuration cannot block noise interference on the low voltage control circuit board, that is, cannot block electromagnetic noise from propagating from a frame ground connected to a high voltage system toward a low voltage circuit, and thus cannot be regarded as perfect protection against the noise.

The present invention, which has been made in view of the above-mentioned circumstances, has an object to provide an inverter module and an inverter integrated electric compressor capable of reliably suppressing noise interference on a control circuit board and facilitating filling with a resin gel material.

Solution to Problem

In order to solve the above-mentioned problems, an inverter module and an inverter integrated electric compressor of the present invention adopt the following solutions.

That is, the present invention provides an inverter module including: a power system circuit board that converts DC power supplied from a power supply into AC power and applies the AC power to an electric motor; and a control circuit board that controls the AC power applied to the electric motor, the power system circuit board and the control circuit board being integrated through a resin case, the inverter module further including an insulating through hole that is provided in a region between: a frame ground connected to a high voltage system formed on the control circuit board; and a low voltage circuit adjacent to the frame ground.

According to the present invention, in the inverter module in which the power system circuit board and the control circuit board are integrated through the resin case, the insulating through hole is provided in the region between: the frame ground connected to the high voltage system formed on the control circuit board; and the low voltage circuit adjacent to the frame ground. Hence, because the insulating through hole is provided in the region between the frame ground and the low voltage circuit, the insulating distance on the control circuit board between the frame ground and the low voltage circuit can be made longer, and electromagnetic noise can be blocked and suppressed from propagating from the frame ground toward the low voltage circuit. Accordingly, such a simple configuration of merely providing the through hole makes it possible to improve the electrical insulating performance near the frame ground on the control circuit board and prevent the inverter apparatus from malfunctioning and the like due to the propagation of the electromagnetic noise toward the low voltage circuit.

In an inverter module according to a first aspect of the present invention, the power system circuit board is provided in a lower part of the resin case, the control circuit board is provided in an upper part thereof, the power system circuit board is sealed with a thermosetting resin that fills the resin case up to a position at which the thermosetting resin covers an upper surface of the power system circuit board, the resin case is filled with a resin gel material from a resin seal surface of the thermosetting resin up to a position at which the resin gel material covers at least part of the control circuit board, and the filling with the resin gel material is possible through the insulating through hole.

According to the inverter module of the first aspect of the present invention, the power system circuit board is provided in the lower part of the resin case, the control circuit board is provided in the upper part thereof, the power system circuit board is sealed with the thermosetting resin that fills the resin case up to the position at which the thermosetting resin covers the upper surface of the power system circuit board, the resin case is filled with the resin gel material from the resin seal surface of the thermosetting resin up to the position at which the resin gel material covers at least part of the control circuit board, and the filling with the resin gel material is possible through the insulating through hole. Accordingly, because the power system circuit board is sealed with the thermosetting resin to be fixed, the electrical insulating properties and the moisture-proof properties can be secured, and the vibration resistance against a heat shock, vibrations, and the like can also be secured. Further, because the resin case is filled with the resin gel material up to the position at which the resin gel material covers part of the control circuit board, the vibration-proof properties and the electrical insulating properties of the control circuit board can be secured, and a damage and the like due to vibrations of components on the control circuit board can be reliably prevented. In addition, because the resin case can be filled with the resin gel material through the insulating through hole up to the rear surface of the control circuit board, the filling properties of the resin gel material can be enhanced, and the resin case can be easily filled with the resin gel material up to a height position at which the resin gel material covers part of the control circuit board.

In the inverter module according to the first aspect of the present invention, the insulating through hole blocks the region between the frame ground on the control circuit board and the low voltage circuit adjacent to the frame ground, and is covered by the resin gel material.

According to the inverter module having this configuration, the insulating through hole blocks the region between the frame ground on the control circuit board and the low voltage circuit adjacent to the frame ground, and is covered by the resin gel material. Hence, the insulating distance on the control circuit board between the frame ground and the low voltage circuit can be made longer by the insulating through hole that blocks the region between the frame ground and the low voltage circuit. Further, because the insulating through hole is covered by the resin gel material, the electrical insulating properties therebetween can be remarkably improved. Accordingly, electromagnetic noise can be reliably blocked and suppressed from propagating from the frame ground toward the low voltage circuit, and the inverter apparatus can be prevented from malfunctioning and the like, resulting in an enhancement in reliability thereof.

The present invention further provides an inverter integrated electric compressor including: an inverter accommodating part that is provided in an outer periphery of a housing in which an electric motor and a compression mechanism are built; and an inverter apparatus that is integrally incorporated in the inverter accommodating part, the inverter apparatus converting DC power into AC power and applying the AC power to the electric motor, in which an inverter apparatus including any of the inverter modules described above is integrally incorporated in the inverter accommodating part.

According to the inverter integrated electric compressor of the present invention, in the inverter integrated electric compressor including the inverter apparatus that is integrally incorporated in the inverter accommodating part that is provided in the outer periphery of the housing, the inverter apparatus converting DC power into AC power and applying the AC power to the electric motor, the inverter apparatus including any of the inverter modules described above is integrally incorporated in the inverter accommodating part. Hence, electromagnetic noise can be blocked and suppressed from propagating from the frame ground toward the low voltage circuit on the control circuit board constituting the inverter apparatus. Accordingly, the electrical insulating performance near the frame ground on the control circuit board can be enhanced, and the inverter apparatus can be prevented from malfunctioning and the like due to the propagation of the electromagnetic noise toward the low voltage circuit. As a result, the reliability of the inverter apparatus, eventually, that of the inverter integrated electric compressor can be improved.

Advantageous Effects of Invention

According to the inverter module of the present invention, because the insulating through hole is provided in the region between the frame ground and the low voltage circuit, the insulating distance on the control circuit board between the frame ground and the low voltage circuit can be made longer, and electromagnetic noise can be blocked and suppressed from propagating from the frame ground toward the low voltage circuit. Accordingly, such a simple configuration of merely providing the through hole makes it possible to improve the electrical insulating performance near the frame ground on the control circuit board and prevent the inverter apparatus from malfunctioning and the like due to the propagation of the electromagnetic noise toward the low voltage circuit.

According to the inverter integrated electric compressor of the present invention, electromagnetic noise can be blocked and suppressed from propagating from the frame ground toward the low voltage circuit on the control circuit board constituting the inverter apparatus. Accordingly, the electrical insulating performance near the frame ground on the control circuit board can be enhanced, and the inverter apparatus can be prevented from malfunctioning and the like due to the propagation of the electromagnetic noise toward the low voltage circuit. As a result, the reliability of the inverter apparatus, eventually, that of the inverter integrated electric compressor can be improved.

DESCRIPTION OF EMBODIMENTS

Hereinafter, an embodiment of the present invention is described with reference to FIG. 1 to FIG. 5.

Figure 1:
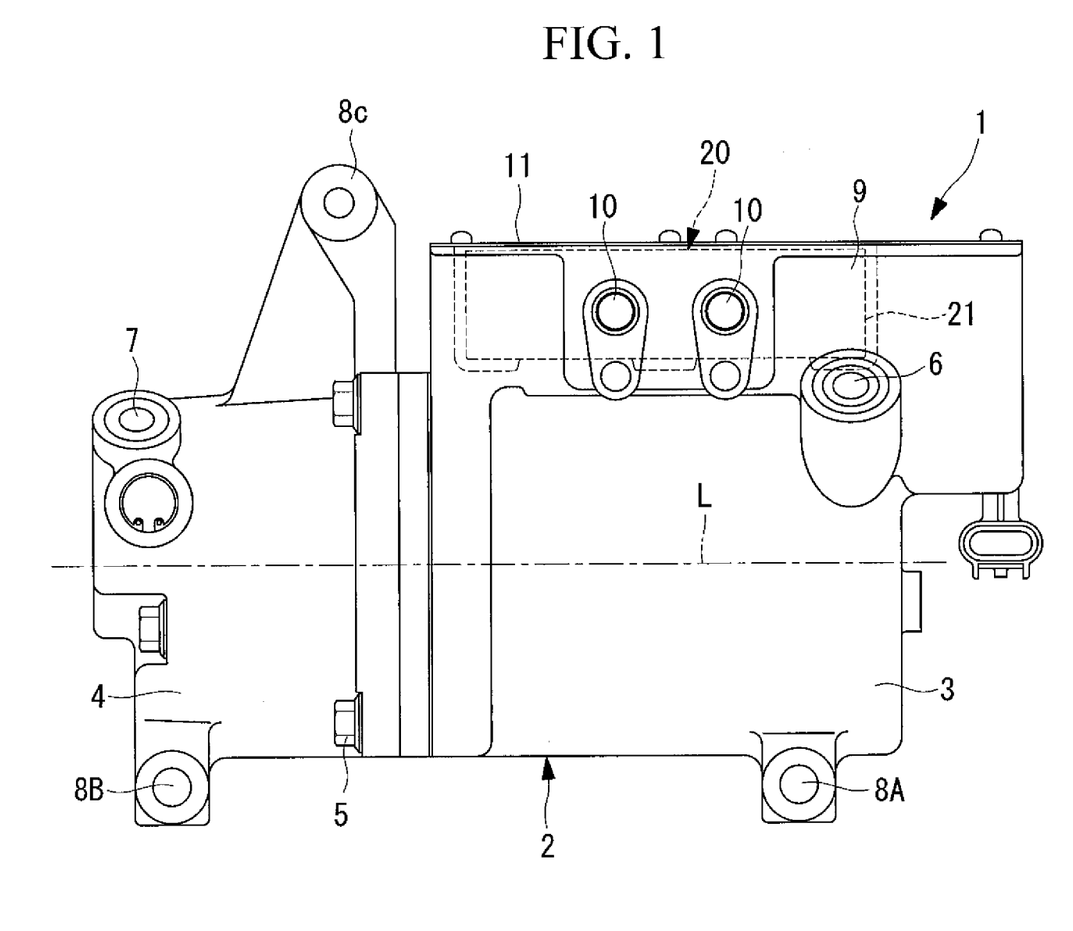
FIG. 1 is a side view of an inverter integrated electric compressor according to an embodiment of the present invention.

FIG. 1 is a side view of an inverter integrated electric compressor according to the embodiment of the present invention. An inverter integrated electric compressor 1 includes a housing 2 constituting an outer frame. The housing 2 is configured by integrally fastening and coupling a motor housing 3 and a compressor housing 4 to each other using bolts 5. An electric motor (omitted from the drawings) is accommodated in the motor housing 3, and a compression mechanism (omitted from the drawings) is accommodated in the compressor housing 4. The motor housing 3 and the compressor housing 4 are pressure-resistant containers, and are formed by aluminum die casting.

The electric motor and the compression mechanism (omitted from the drawings) accommodated in the housing 2 are coupled to each other through a motor shaft, and the compression mechanism is driven by rotation of the electric motor. A refrigerant suction port 6 is provided on one end side of the motor housing 3 (on the right side of the inverter integrated electric compressor 1 of FIG. 1). Low-temperature low-pressure refrigerant gas suctioned from the refrigerant suction port 6 into the motor housing 3 circulates around the electric motor along a motor shaft line L direction, and then is suctioned into the compression mechanism to be compressed thereby. The high-temperature high-pressure refrigerant gas compressed by the compression mechanism is discharged into the compressor housing 4, and then is sent to the outside from a discharge port 7 provided on one end side of the compressor housing 4 (on the left side of the inverter integrated electric compressor 1 of FIG. 1).

The housing 2 is provided with attachment legs 8A, 8B, and 8C at, for example, totally three positions, that is, two positions of: a lower part on the one end side of the motor housing 3 (on the right side of the inverter integrated electric compressor 1 of FIG. 1); and a lower part on the one end side of the compressor housing 4 (on the left side of the inverter integrated electric compressor 1 of FIG. 1), and one position of an upper part of the compressor housing 4. The attachment legs 8A, 8B, and 8C are fixed and set, using brackets and bolts, to side walls or the like of a motor for running set in an engine room of a vehicle, whereby the inverter integrated electric compressor 1 is mounted on the vehicle.

An inverter accommodating part 9 having a predetermined volume in its upper part is integrally molded in an outer peripheral part of the motor housing 3. The inverter accommodating part 9 has a box shape that has an opened upper surface and is surrounded by side walls having a predetermined height, and two power supply cable take-out ports 10 are provided on a side surface of the inverter accommodating part 9. Further, a cover member 11 is screwed to the upper surface of the inverter accommodating part 9, whereby the inverter accommodating part 9 is hermetically sealed.

Figure 2:
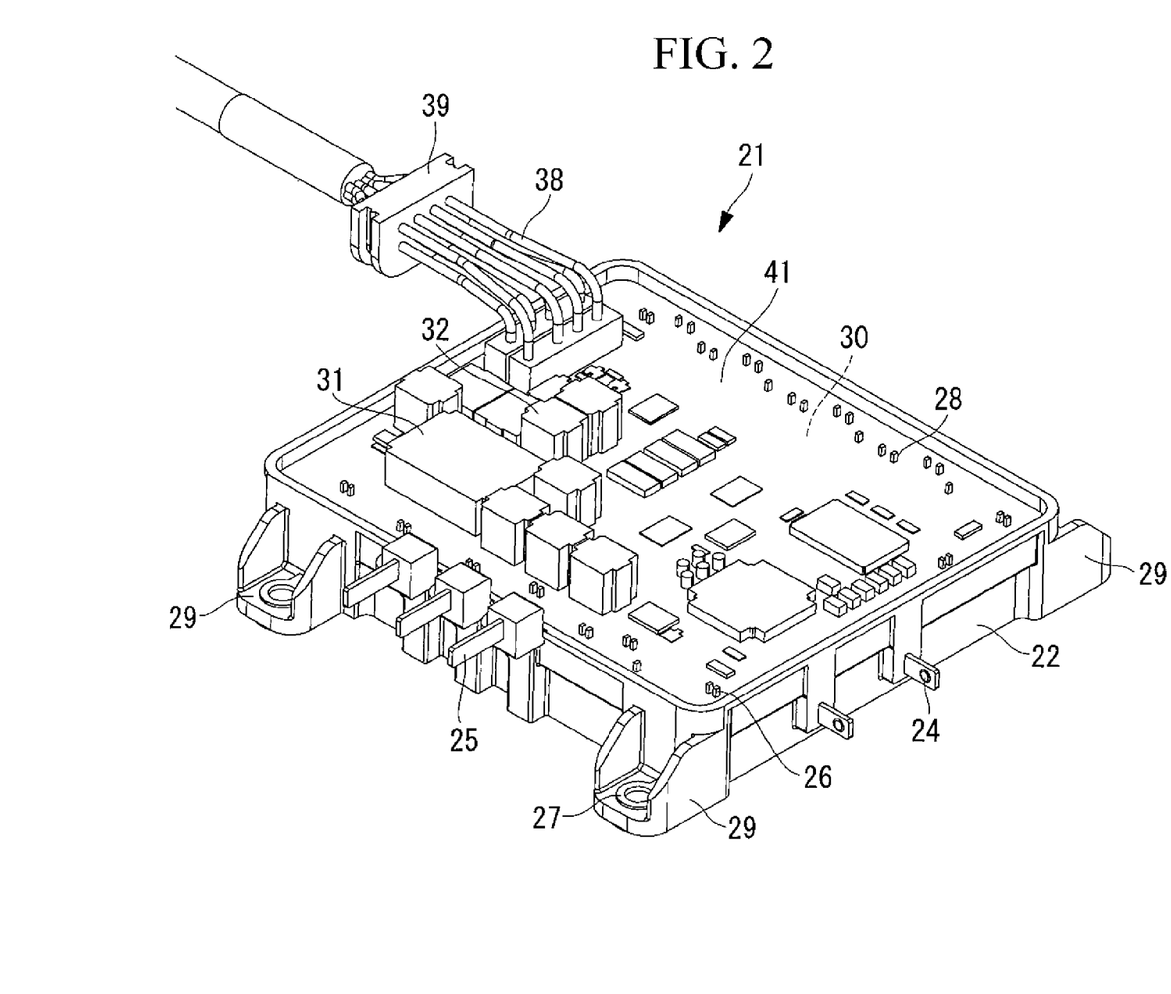
FIG. 2 is a perspective view of an inverter module incorporated in the inverter integrated electric compressor illustrated in FIG. 1.
Figure 3:
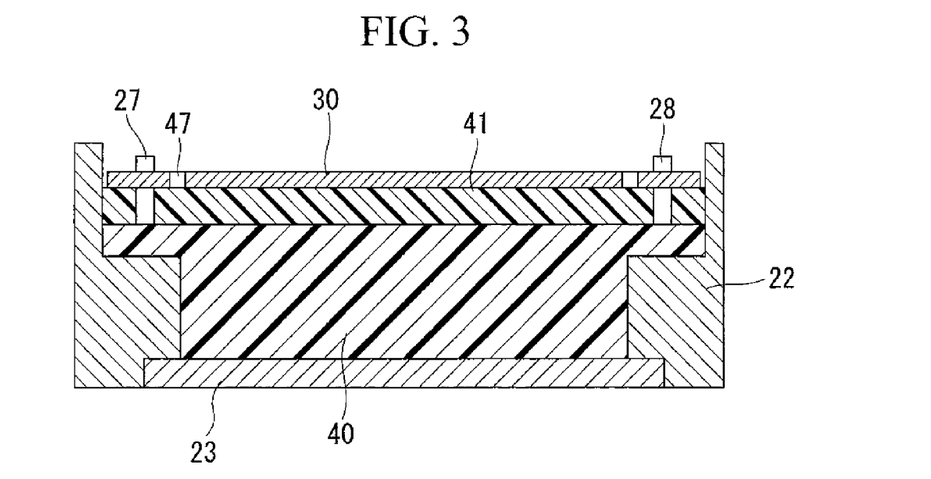
FIG. 3 is a view corresponding to a vertical section of the inverter module illustrated in FIG. 2.

An inverter apparatus 20 is accommodated and set in the inverter accommodating part 9, and the inverter apparatus 20 converts DC power that is supplied from a power supply unit or a battery (omitted from the drawings) mounted on the vehicle through a power supply cable, into three-phase AC power, and applies the three-phase AC power to the electric motor accommodated in the motor housing 3. The inverter apparatus 20 is formed of electrical components such as an inverter module 21 to be described later in detail, a smoothing capacitor (head capacitor) (omitted from the drawings), and an inductor coil. FIG. 2 is a perspective view of the inverter module 21, and FIG. 3 is a view corresponding to a vertical section of the inverter module 21 illustrated in FIG. 2.

The inverter module 21 includes a rectangular resin case 22 having a bottom part with which a power system circuit board 23 (see FIG. 3) made of an aluminum alloy plate and the like is integrated by insert molding. A switching circuit is mounted on the power system circuit board 23, and the switching circuit is formed of a plurality of semiconductor switching elements and the like such as IGBTs. Further, in addition to the power system circuit board 23, a P-N terminal 24 to which a high-voltage power supply line is connected, a U-V-W terminal 25 for feeding the three-phase AC power to the electric motor, an earth 26 and an earth terminal 27, a large number of connection terminals 28 for connecting the power system circuit board 23 to a control circuit board 30 to be described later, and the like are connected to the resin case 22 through a bus bar, and are integrated therewith by insert molding.

Figure 5:
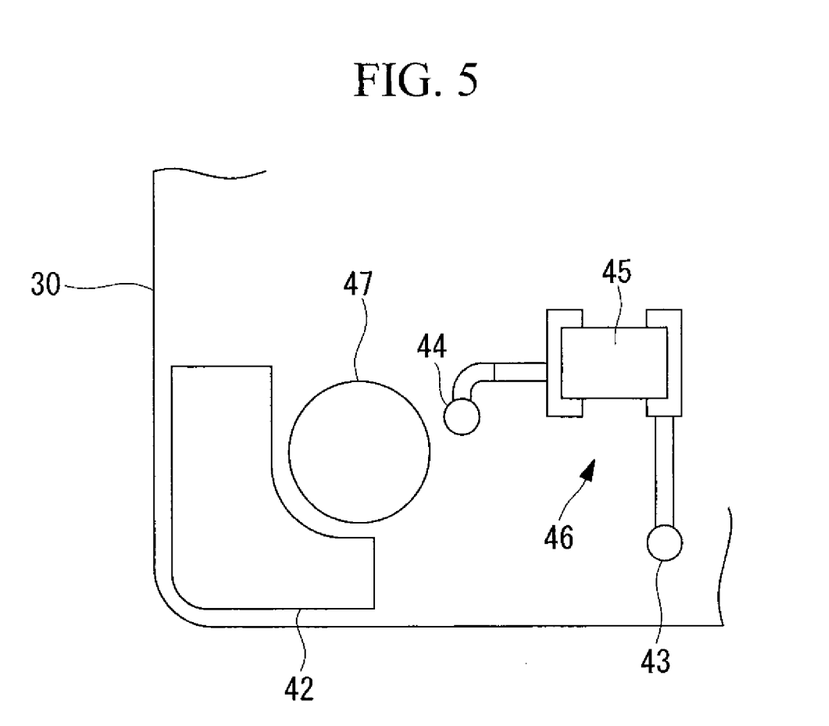
FIG. 5 is an enlarged plan view of a part A in FIG. 4.

The resin case 22 has the rectangular shape as described above, the P-N terminal 24 is protruded from one side along the side surface of the inverter accommodating part 9 on which the power supply cable take-out ports 10 are provided, and the U-V-W terminal 25 is protruded from another side that is adjacent to the one side and near the compressor housing 4. Further, fixing leg parts 29 are integrally molded at four corner parts of the resin case 22, and the fixing leg parts 29 are fastened and fixed to a bottom surface of the inverter accommodating part 9 using bolts. Each fixing leg part 29 is provided with the earth terminal 27 such that the bolt can pass therethrough, and the resin case 22 is fixed to the bottom surface of the inverter accommodating part 9 using bolts, whereby the power system circuit board 23 and a frame ground 42 (whose connection land is illustrated in FIG. 5) to be described later of the control circuit board 30 are case-grounded to the housing 2.

The control circuit board (CPU circuit board) 30 is placed in an upper part of the resin case 22 with a predetermined interval being kept between the power system circuit board 23 and the control circuit board 30, and the control circuit board 30 is supported by the large number of connection terminals 28 and the earth 26. A control communication circuit formed of elements and the like that operate at a low voltage, such as a CPU, is mounted on the control circuit board 30, and the control circuit board 30 operates the switching circuit mounted on the power system circuit board 23, and controls the AC power applied to the electric motor.

Figure 4:
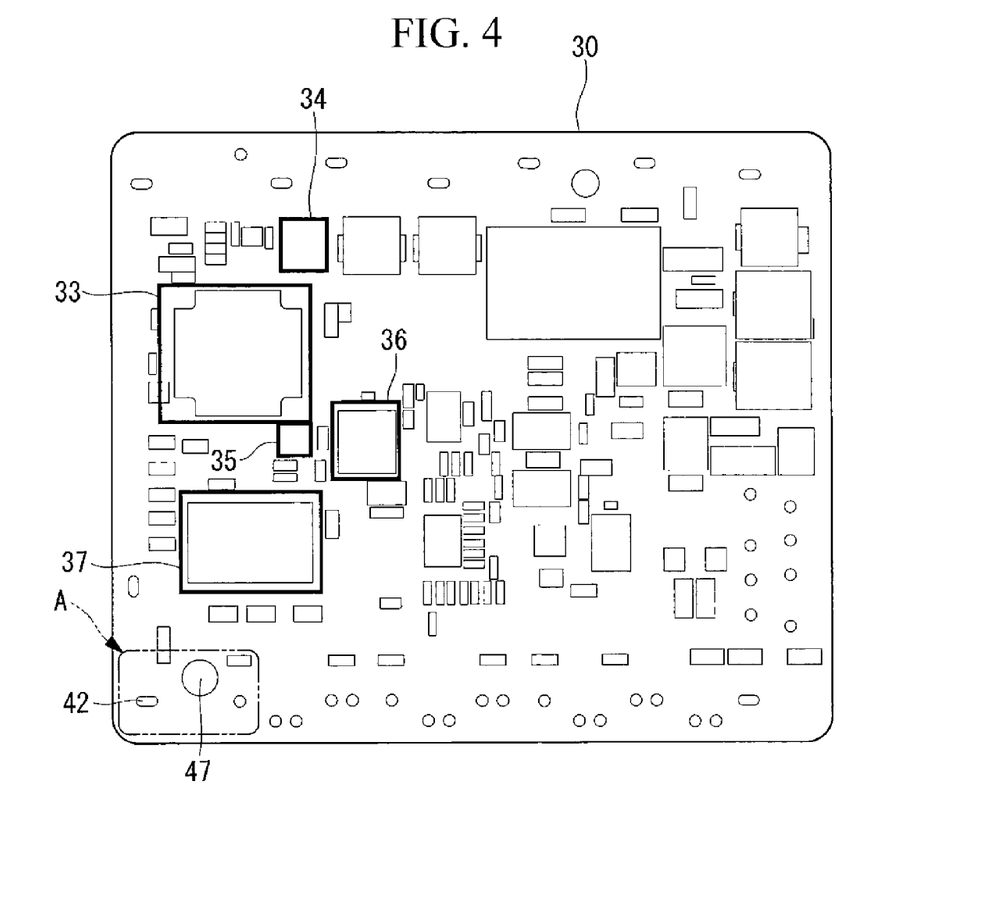
FIG. 4 is a planar arrangement view of a control circuit board constituting the inverter module illustrated in FIG. 2.

On the control circuit board 30, as illustrated in FIG. 4, a large number of electrical components and circuits such as a CPU 33, an EEPROM 34, an oscillation circuit 35, a reset IC circuit 36, and a gate IC circuit 37 are placed in addition to large-scale electrical components such as a transformer 31 and an electrolytic capacitor 32 constituting the control communication circuit. Note that a plurality of electrical lines for control communication and communication lines 38 are connected to the control circuit board 30 through a grommet 39 so as to pass through the inverter accommodating part 9.

In order to secure the vibration-proof properties, the moisture-proof properties, and the electrical insulating properties of the power system circuit board 23 and the control circuit board 30 in the inverter module 21 having the above-mentioned configuration, the resin case 22 is filled with a thermosetting resin 40 such as an epoxy-based resin such that the upper surface of the power system circuit board 23 is covered by the thermosetting resin 40, whereby the power system circuit board 23 is sealed with the resin. This serves to firmly fix, with the thermosetting resin 40, the switching circuit formed of the wire-bonded semiconductor switching elements such as the IGBTs, to thereby secure the electrical insulating properties and the moisture-proof properties, and this also serves to secure the vibration resistance with a high reliability even against a high-degree thermal cycle, heat shock, vibrations, and the like. As illustrated in FIG. 3, the resin case 22 is filled with the thermosetting resin 40 up to a position slightly higher than a middle part in the height direction of the resin case 22.

The resin case 22 is further filled with a resin gel material 41 such as silicone gel on a resin seal surface of the thermosetting resin 40. The resin gel material 41 fully fills the space between the seal surface of the thermosetting resin 40 and the control circuit board 30 (see FIG. 3). The resin gel material 41 mainly absorbs vibrations of the control circuit board 30, to thereby secure the vibration-proof properties thereof and also secure the electrical insulating properties thereof. Alternatively, for some situations, the resin case 22 may be filled with the resin gel material 41 up to a position several millimeters higher than a surface of the control circuit board 30, and at least parts of microcomputer components such as the CPU and the oscillation circuit mounted on the upper surface of the control circuit board 30 may be covered by the resin gel material 41. This can enhance a moisture-proof effect for the electrical components such as: the microcomputer components such as the CPU; and the oscillation circuit mounted on the upper surface of the control circuit board 30.

Further, as illustrated in FIG. 4 and FIG. 5, the frame ground 42 that is case-grounded to the housing 2 trough the earth 26 and the earth terminal 27 is formed on the control circuit board 30, and a low voltage circuit 46 is placed adjacently to the connection land of the frame ground 42. The low voltage circuit 46 includes: a low voltage terminal (through hole) 43 for signal transmission to the semiconductor switching elements; a low voltage terminal (through hole) 44 for a gate driver; and a resistor 45. An insulating through hole 47 for blocking electromagnetic noise is provided in a region between: the connection land of the frame ground 42 connected to the high voltage system; and the low voltage circuit 46 including the low voltage terminal 43 for signal transmission to the semiconductor switching elements and the like, and the insulating through hole 47 blocks the region.

It is sufficient that the insulating through hole 47 can make the insulating distance between the connection land of the frame ground 42 and the low voltage circuit 46 as long as possible. Hence, the insulating through hole 47 is not limited to such a round hole as in the present embodiment, and may be an elongate hole, a rectangle hole, and modified holes having various shapes. Further, the number of insulating through holes 47 is not limited to one, and a plurality of insulating through holes 47 may be respectively provided between lands of other frame grounds 42 and other low voltage circuits. Moreover, the insulating through hole 47 also functions as a filling hole for fully filling the space between the resin seal surface of the thermosetting resin 40 and the control circuit board 30 with the resin gel material 41.

In this way, the present embodiment produces the following operations and effects.

The DC power is fed from the power supply unit mounted on the vehicle to the inverter apparatus 20 set in the inverter accommodating part 9 through the power supply cable, passes through the P-N terminal 24 of the inverter module 21, and is inputted to the switching circuit on the power system circuit board 23. Then, the DC power is converted into the three-phase AC power having a designated frequency by an operation of the switching circuit formed of the semiconductor switching elements and the like controlled by the control circuit board 30, and then is applied to the electric motor in the motor housing 3 through the U-V-W terminal 25.

As a result, the electric motor is rotationally driven at the control designated frequency, and the compression mechanism is actuated. The actuation of the compression mechanism causes the low-temperature low-pressure refrigerant gas to be suctioned from the refrigerant suction port 6 into the motor housing 3. The refrigerant is moved around the electric motor in the motor shaft line L direction toward the compressor housing 4 to be suctioned into the compression mechanism. The refrigerant that is compressed into a high-temperature high-pressure state by the compression mechanism is discharged into the compressor housing 4, and then is sent to the outside of the electric compressor 1 through the discharge port 7.

In the mean time, the low-temperature low-pressure refrigerant gas that is suctioned from the refrigerant suction port 6 into the motor housing 3 and is moved in the motor shaft line L direction absorbs heat from the power system circuit board 23 of the inverter module 21 that is set in close contact with the bottom surface of the inverter accommodating part 9, with the intermediation of a housing wall of the motor housing 3, and the low-temperature low-pressure refrigerant gas thus forcedly cools heat generating components such as the semiconductor switching elements mounted on the power system circuit board 23. This secures the heat resistance performance of the inverter apparatus 20.

Meanwhile, running vibrations of the vehicle on which the electric compressor 1 is mounted, vibrations of a driving source of the vehicle, rotating vibrations of the electric compressor 1 itself, or the like are inputted directly to the inverter apparatus 20 incorporated in the electric compressor 1. Accordingly, the vibrations are propagated to the inverter module 21 constituting the inverter apparatus 20, the power system circuit board 23, and the control circuit board 31, and the vibrations are further propagated to the electrical components, the circuits, and the like set on the two circuit boards 23 and 31.

Under the circumstances, the power system circuit board 23 is modularized integrally with the resin case 22, and the fixing leg parts 29 are firmly fastened and fixed to the bottom surface of the inverter accommodating part 9 using the bolts. Further, the components and the circuits mounted on the surface of the power system circuit board 23, such as the semiconductor switching elements, are sealed with the epoxy-based thermosetting resin 40 having electrical insulating properties and moisture-proof properties, and are firmly protected thereby. This can sufficiently secure the electrical insulating properties and the moisture-proof properties for the power system circuit board 21, and this also can enhance the vibration resistance against a high-degree thermal cycle, heat shock, vibrations, and the like, to thereby secure the vibration-proof properties.

Further, the control circuit board 30 placed above the power system circuit board 23 is elastically supported by the resin gel material 41 that fully fills the space between the lower surface of the control circuit board 30 and the resin seal surface of the thermosetting resin 40 up to a position at which the resin gel material 41 covers part of the control circuit board 31. Hence, vibrations applied to the control circuit board 30 can be absorbed by the resin gel material 41. Accordingly, the vibrations propagated to the control circuit board 30 can be sufficiently reduced, and the components can be prevented from being damaged, falling, and the like due to excessive vibrations of the control circuit board 30.

Moreover, resin layers of the thermosetting resin 40, the resin gel material 41, and the like are formed between the power system circuit board 23 and the control circuit board 30 respectively placed in the lower and upper parts of the resin case 22, and a sufficient insulating distance is secured therebetween. Hence, noise interference between the two circuit boards can be prevented. Further, because the insulating through hole 47 is provided in the region between: the frame ground 42 connected to the high voltage system formed on the control circuit board 30; and the low voltage circuit 46 adjacent to the frame ground 42, the insulating distance on the control circuit board 30 between the frame ground 42 and the low voltage circuit 46 can be made longer, and electromagnetic noise can be blocked and suppressed from propagating from the frame ground 42 toward the low voltage circuit 46.

In particular, the electromagnetic noise can be effectively blocked and suppressed from propagating to the low voltage terminal (through hole) 43 for signal transmission to the semiconductor switching elements such as the IGBTs that are susceptible to the electromagnetic noise. Accordingly, such a simple configuration of merely providing the through hole 47 at a given position on the control circuit board 30 makes it possible to improve the electrical insulating performance near the frame ground 42 on the control circuit board 30 and prevent the inverter apparatus 20 from malfunctioning and the like due to propagation of the electromagnetic noise toward the low voltage circuit 46.

Further, the insulating through hole 47 is caused to also function as the filling hole for filling the space between the resin seal surface of the thermosetting resin 40 and the control circuit board 30 with the resin gel material 41, and hence the resin case 22 can be reliably fully filled with the resin gel material 41 through the insulating through hole 47 up to the rear surface of the control circuit board 30. Accordingly, the filling properties of the resin gel material 41 can be enhanced, and the resin case 22 can be easily filled with the resin gel material 41 up to a height position at which the resin gel material 41 covers part of the control circuit board 30.

Moreover, the insulating through hole 47 is provided so as to block the region between the frame ground 42 and the low voltage circuit 46 on the control circuit board 30, and is covered by the resin gel material 41. Hence, the insulating distance between the frame ground 42 and the low voltage circuit 46 can be made longer by the insulating through hole 47 that blocks the region between the frame ground 42 and the low voltage circuit 46. Further, because the insulating through hole 47 is covered by the resin gel material 41, the electrical insulating properties therebetween can be remarkably improved. Accordingly, the noise can be reliably blocked and suppressed from propagating from the frame ground 42 toward the low voltage circuit 46, and the inverter apparatus 20 can be prevented from malfunctioning and the like, resulting in an enhancement in reliability thereof.

Further, the inverter apparatus 20 including the inverter module 21 described above is integrally incorporated in the in-vehicle inverter integrated electric compressor 1 used under severe electromagnetic noise conditions, temperature conditions, and vibration conditions. Hence, noise interference can be suppressed in the inverter apparatus 20 that is most susceptible to usage environment, and the vibration resistance, the moisture-proof properties, and the electrical insulating properties can be improved. Accordingly, the reliability and mounting properties of the inverter integrated electric compressor 1 can be improved.

Note that the present invention is not limited to an invention according to the above-mentioned embodiment, and can be changed as appropriate in a range not departing from the gist thereof. For example, in the above-mentioned embodiment, description is given of an example in which the inverter accommodating part 9 is molded integrally with the motor housing 3, but the inverter accommodating part 9 does not necessarily need to be molded integrally therewith. An inverter accommodating case molded separately may be incorporated integrally therewith. Further, the compression mechanism is not particularly limited, and a compression mechanism in any form may be used.

Moreover, the configuration of the inverter module 21 can be variously changed. In particular, in the above-mentioned embodiment, description is given of an example in which the insulating through hole 47 is provided in the region between the low voltage circuit 46 and the frame ground 42, the low voltage circuit 46 including the low voltage terminal (through hole) 43 for signal transmission to the semiconductor switching elements that are susceptible to the electromagnetic noise. Alternatively, in the case where a low voltage circuit such as the CPU 33, the EEPROM 34, the oscillation circuit 35, the reset IC circuit 36, or the gate IC circuit 37 is placed adjacently to the frame ground 42 as needed, the insulating through hole 47 may be provided therebetween.

REFERENCE SIGNS LIST 1 inverter integrated electric compressor
2 housing
9 inverter accommodating part
20 inverter apparatus
21 inverter module
22 resin case
23 power system circuit board
30 control circuit board
40 thermosetting resin
41 resin gel material
42 frame ground
46 low voltage circuit
47 insulating through hole

The invention claimed is:

1. An inverter module comprising:
   a power system circuit board that converts DC power supplied from a power supply into AC power and applies the AC power to an electric motor; and
   a control circuit board that controls the AC power applied to the electric motor,
   the power system circuit board and the control circuit board being integrated through a resin case,
   the inverter module further comprising an insulating through hole that is provided in a region between: a frame ground connected to a high voltage system formed on the control circuit board; and a low voltage circuit adjacent to the frame ground.

2. The inverter module according to claim 1, wherein
   the power system circuit board is provided in a lower part of the resin case, and the control circuit board is provided in an upper part thereof,
   the power system circuit board is sealed with a thermosetting resin that fills the resin case up to a position at which the thermosetting resin covers an upper surface of the power system circuit board,
   the resin case is filled with a resin gel material from a resin seal surface of the thermosetting resin up to a position at which the resin gel material covers at least part of the control circuit board, and the filling with the resin gel material is possible through the insulating through hole.

3. The inverter module according to claim 2, wherein the insulating through hole blocks the region between the frame ground on the control circuit board and the low voltage circuit adjacent to the frame ground, and is covered by the resin gel material.

4. An inverter integrated electric compressor comprising:

an inverter accommodating part that is provided in an outer periphery of a housing in which an electric motor and a compression mechanism are built; and an inverter apparatus that is integrally incorporated in the inverter accommodating part, the inverter apparatus converting DC power into AC power and applying the AC power to the electric motor, wherein an inverter apparatus including the inverter module according to claim 3 is integrally incorporated in the inverter accommodating part.

5. An inverter integrated electric compressor comprising:

an inverter accommodating part that is provided in an outer periphery of a housing in which an electric motor and a compression mechanism are built; and an inverter apparatus that is integrally incorporated in the inverter accommodating part, the inverter apparatus converting DC power into AC power and applying the AC power to the electric motor, wherein an inverter apparatus including the inverter module according to claim 2 is integrally incorporated in the inverter accommodating part.

6. An inverter integrated electric compressor comprising:

an inverter accommodating part that is provided in an outer periphery of a housing in which an electric motor and a compression mechanism are built; and an inverter apparatus that is integrally incorporated in the inverter accommodating part, the inverter apparatus converting DC power into AC power and applying the AC power to the electric motor, wherein an inverter apparatus including the inverter module according to claim 1 is integrally incorporated in the inverter accommodating part.

* * * * *